United States Patent
Fujisawa et al.

(10) Patent No.: US 10,125,209 B2
(45) Date of Patent: Nov. 13, 2018

(54) MACROMONOMER MIXTURE, TERMINAL-REACTIVE POLYMER MIXTURE, INTERMEDIATE FOR MACROMONOMER AND SILICONE HYDROGEL

(71) Applicant: Johnson & Johnson Vision Care, Inc., Jacksonville, FL (US)

(72) Inventors: Kazuhiko Fujisawa, Shiga (JP); Masataka Nakamura, Shiga (JP)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 776 days.

(21) Appl. No.: 14/264,465

(22) Filed: Apr. 29, 2014

(65) Prior Publication Data
US 2014/0235782 A1   Aug. 21, 2014

Related U.S. Application Data

(62) Division of application No. 12/975,509, filed on Dec. 22, 2010, now Pat. No. 8,748,548.

(30) Foreign Application Priority Data

Dec. 28, 2009 (JP) .................. 2009-296803

(51) Int. Cl.
C08F 290/04 (2006.01)
C08F 290/02 (2006.01)
(Continued)

(52) U.S. Cl.
CPC ............. *C08F 290/02* (2013.01); *C08F 8/46* (2013.01); *C08F 220/26* (2013.01);
(Continued)

(58) Field of Classification Search
CPC ................ C08F 290/02; C08F 290/046; C08F 290/044; C08F 290/042; C08F 8/46; C08L 23/26
See application file for complete search history.

(56) References Cited

U.S. PATENT DOCUMENTS 3,390,206 A * 6/1968 Morice .............. C08F 2/38
525/117
5,030,534 A * 7/1991 Kato .............. G03G 5/0592
430/127

(Continued)

FOREIGN PATENT DOCUMENTS

| JP | 63054413 | 3/1988 |
| JP | 2008514799 | 5/2008 |
| WO | WO 1993022355 A1 | 11/1993 |
| WO | 2006039466 A1 | 4/2006 |

OTHER PUBLICATIONS

PCT International Search Report, dated Nov. 4, 2011, for PCT Int'l Appln. No. PCT/US2010/061966.

*Primary Examiner* — Ling Siu Choi
*Assistant Examiner* — David L Miller
(74) *Attorney, Agent, or Firm* — Raef M. Shaltout

(57) ABSTRACT

To obtain a hydrophilic macromonomer mixture which is a highly polymerized hydrophilic macromonomer, has few components not bonded to the polymer chain after polymerization, and is less likely to leaching. Provided is a macromonomer mixture containing macromonomer A being a macromonomer having a group obtained by further introducing a polymerizable group into a reactive group derived from a polymerization initiator at an end thereof; and macromonomer B being a macromonomer having a group obtained by further introducing a polymerizable group into a reactive group derived from a chain transfer agent at an end thereof.

6 Claims, 3 Drawing Sheets

(51) Int. Cl.

| | | |
|---|---|---|
| *C08F 8/46* | (2006.01) | |
| *C08L 23/26* | (2006.01) | |
| *C08F 220/26* | (2006.01) | |
| *C08F 220/36* | (2006.01) | |
| *C08F 220/38* | (2006.01) | |
| *C08L 39/06* | (2006.01) | |
| *C08L 43/04* | (2006.01) | |

(52) U.S. Cl.
CPC .......... *C08F 220/36* (2013.01); *C08F 220/38* (2013.01); *C08F 290/042* (2013.01); *C08F 290/044* (2013.01); *C08F 290/046* (2013.01); *C08L 23/26* (2013.01); *C08L 39/06* (2013.01); *C08L 43/04* (2013.01)

(56) References Cited

U.S. PATENT DOCUMENTS

| | | | | |
|---|---|---|---|---|
| 5,073,470 | A * | 12/1991 | Kato | G03G 9/131 |
| | | | | 430/114 |
| 6,100,350 | A | 8/2000 | Wilczek | |
| 8,748,548 | B2 * | 6/2014 | Fujisawa | C08F 220/26 |
| | | | | 525/910 |
| 2002/0045706 | A1 | 4/2002 | Houston | |
| 2008/0003252 | A1 | 1/2008 | Lai | |
| 2008/0070319 | A1 | 3/2008 | Makino | |

* cited by examiner

MACROMONOMER MIXTURE, TERMINAL-REACTIVE POLYMER MIXTURE, INTERMEDIATE FOR MACROMONOMER AND SILICONE HYDROGEL

RELATED APPLICATIONS

This application is a divisional of U.S. patent application Ser. No. 12/975,509, filed Dec. 22, 2010, currently pending which claims priority to JP2009-296803 filed on Dec. 28, 2009.

BACKGROUND

The present invention relates to a highly functionalized macromonomer mixture, a terminal-reactive polymer mixture, an intermediate for macromonomer and a silicone hydrogel. The macromonomer mixture shows good wettability, has few components not bonded to the polymer chain, and is less likely to leaching, so that it is suitably used in medical devices such as ophthalmic lenses, endoscopes, catheters, transfusion tubes, gas transfer tubes, stents, sheaths, cuffs, tube connecters, access ports, drainage bags, blood circuits, wound covering materials and various types of medicine carriers, above all, contact lenses, intraocular lenses, and artificial corneas.

As a material used for continuous wear, a contact lens using a silicone hydrogel material has been known recently. Since silicone is hydrophobic, in order to give wettability to the surface, many ideas have been proposed so far. As one of those, there is known a method in which a hydrophilic macromonomer is added to a monomer mixture to copolymerize it with other monomers (Patent document 1). As a synthetic method of the hydrophilic macromonomer, there is known a method in which after polymerization of a hydrophilic monomer containing a chain transfer agent with a functional group, a compound having a polymerizable functional group is reacted with the functional group to give a hydrophilic macromonomer. However, the hydrophilic macromonomer obtained by this method contains a hydrophilic polymer having a polymerization initiator fragment with no functional group. Thus, when a polymerizable group is tried to be introduced, such a polymer chain with no functional group and into which no polymerizable group can be introduced is contained, and in the case of use in copolymerization with a monomer mixture, there has been a problem that leaching of the hydrophilic polymer occurs. There has also been a problem that the wettability of the resulting copolymer is insufficient.

PRIOR ART DOCUMENT

Patent Document

Patent Document 1: US Patent Publication No. 2008/0003252

SUMMARY

The present invention aims to provide a highly polymerized hydrophilic macromonomer obtained by polymerizing a hydrophilic polymer using a polymerization initiator with a functional group in a molecule and a chain transfer agent with a functional group in a molecule concomitantly, then by introducing a polymerizable group into the functional groups. A polymer obtained by copolymerization of the hydrophilic macromonomer of the present invention shows good wettability, has few components not bonded to the polymer chain and is less likely to leaching, so that it is suitable as a raw material of ophthalmic lenses such as a contact lens, an intraocular lens and artificial corneas.

In order to achieve the above-described object, the present invention has the following constitution. That is, (1) A macromonomer mixture containing macromonomer A being a macromonomer having a group obtained by further introducing a polymerizable group into a reactive group derived from a polymerization initiator at an end thereof; and macromonomer B being a macromonomer having a group obtained by further introducing a polymerizable group into a reactive group derived from a chain transfer agent at an end thereof;

(2) The macromonomer mixture of (1), containing at least one kind of macromonomer A expressed by the following general formula (I):

[Chemical Structure 1]

[Chemical Structure 2]

[Chemical Structure 3]

[Chemical Structure 4]

-continued
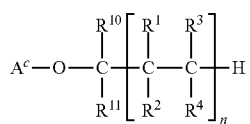 (c2)
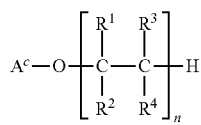 (c3)
[Chemical Structure 5]
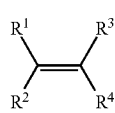 (m)
[Chemical Structure 6]
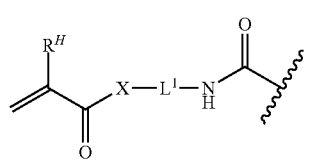 (a1)
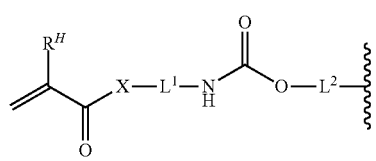 (a2)
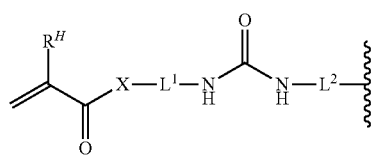 (a3)
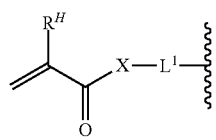 (a4)
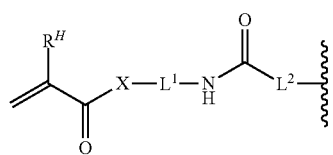 (a5)
[Chemical Structure 7]
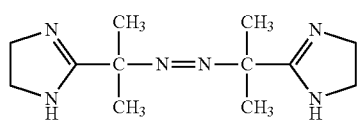 (j1)
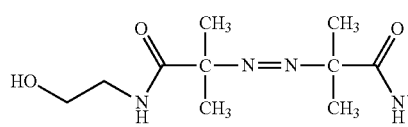 (j2)
-continued
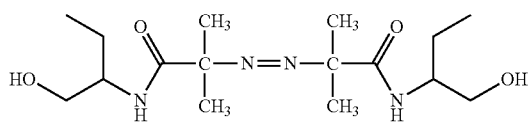 (j3)
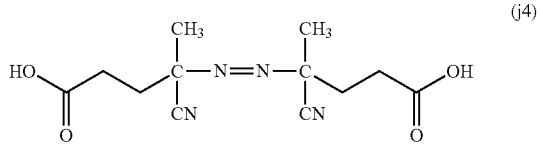 (j4)
[Chemical Structure 8]
 (d1)
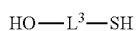 (d2)
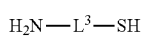 (d3)
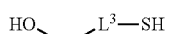 (d4)
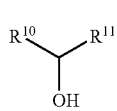 (d5)
[Chemical Structure 9]
 (III)
[Chemical Structure 10]
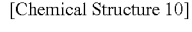 (IV)
[Chemical Structure 11]
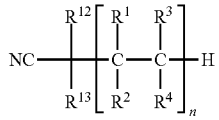 (x1)
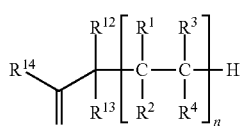 (x2)
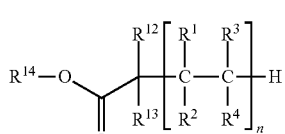 (x3)
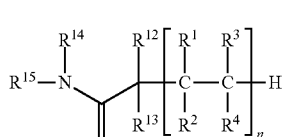 (x4)

-continued
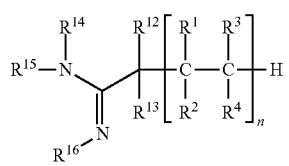
[Chemical Structure 12]
(x5)
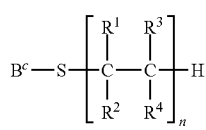
(y1)
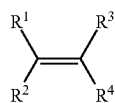
(y2)
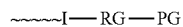
[Chemical Structure 13]
(y3)
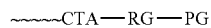
[Chemical Structure 14]
(m)
~~~~I—RG—PG
[Chemical Structure 15]
(I)
~~~~CTA—RG—PG
[Chemical Structure 16]
(II)
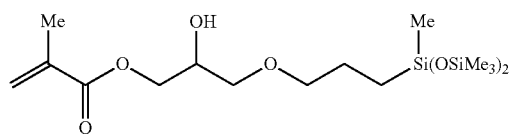
(s1)
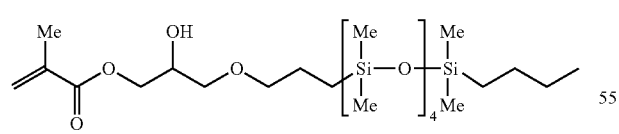
(s2)
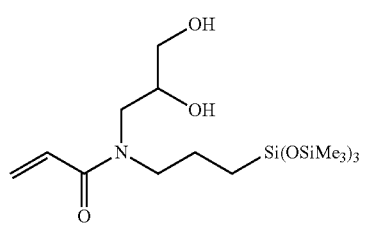
(s3)
[Chemical Structure 17]
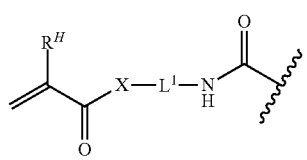
(b1)
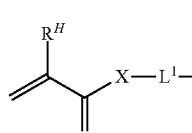
(b2)
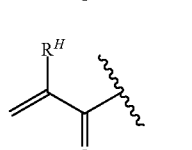
(b3)
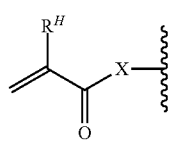
(b4)
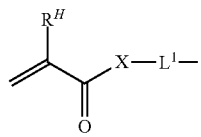
(b5)
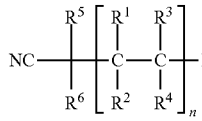
(b6)
[Chemical Structure 18]
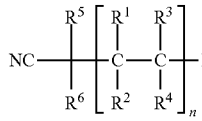
(i1)
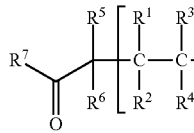
(i2)
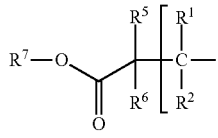
(i3)
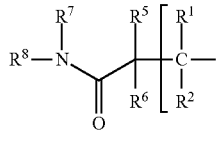
(i4)

[Chemical Structure 19]
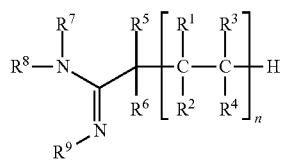
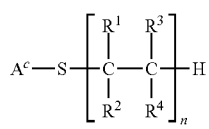
[Chemical Structure 20]
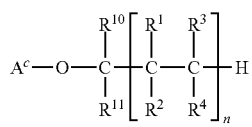
[Chemical Structure 21]
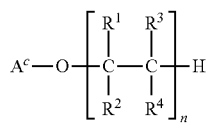
(a1)
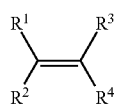
(a2)
(a3)
(a4)
(a5)
[Chemical Structure 22]
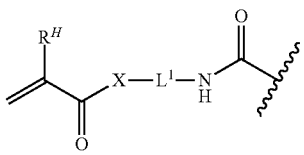 (a1)
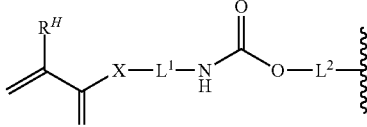 (a2)
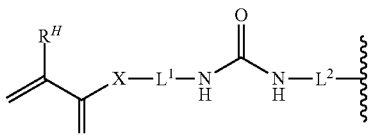 (a3)
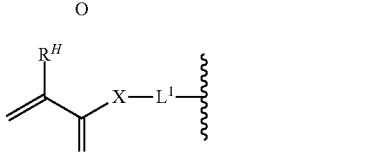 (a4)
 (a5)
[Chemical Structure 23]
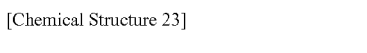 (e1)
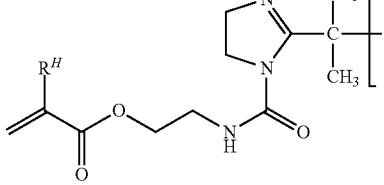 (e2)
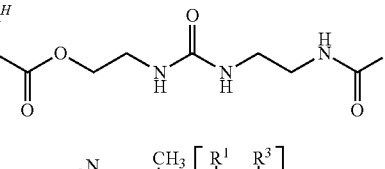 (e3)
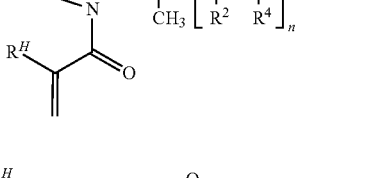 (e4)
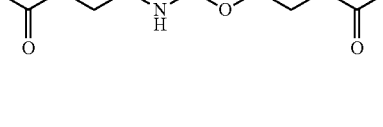

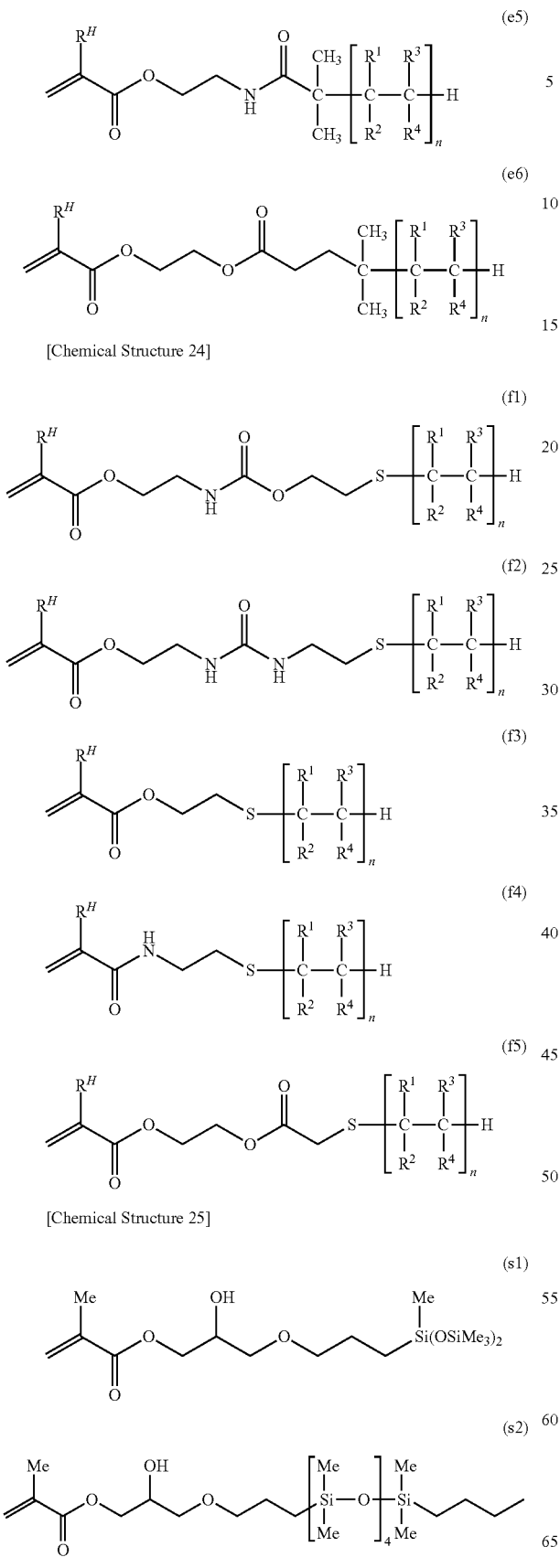
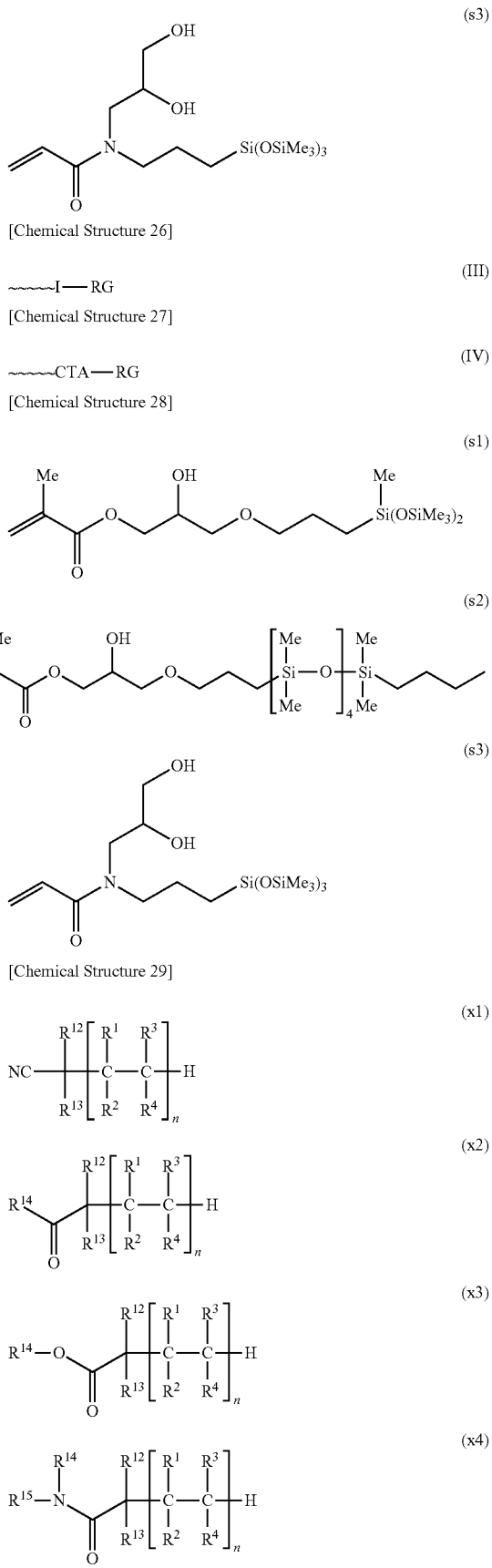

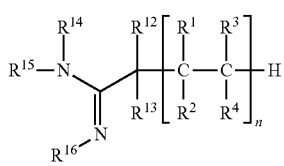
[Chemical Structure 30]

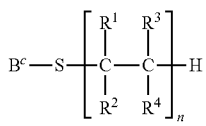

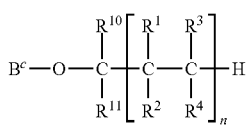

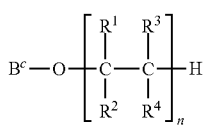
[Chemical Structure 31]

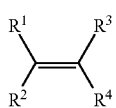
[Chemical Structure 32]

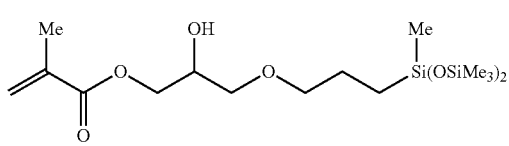

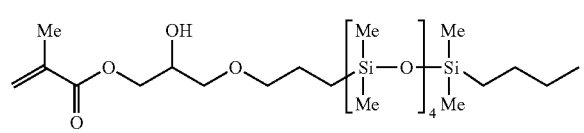

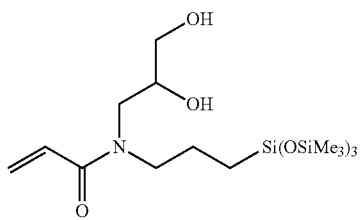
[Chemical Structure 33]

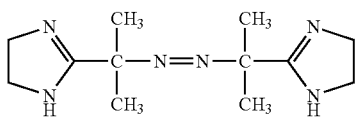

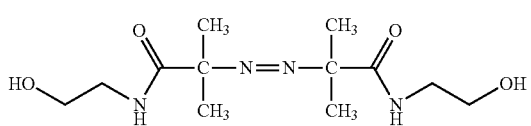

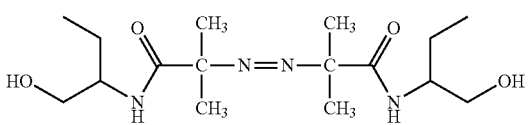

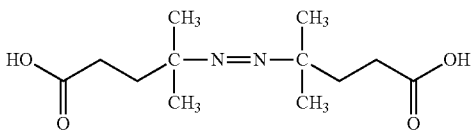
[Chemical Structure 34]

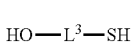

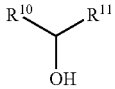
[Chemical Structure 35]

[Chemical Structure 36]

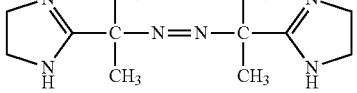
[Chemical Structure 37]

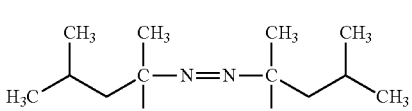

[Chemical Structure 38]

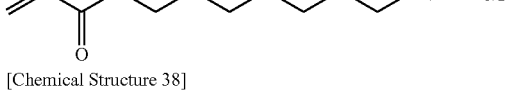

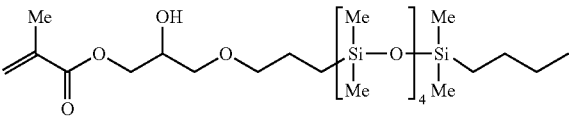

and at least one kind of macromonomer B expressed by the following general formula (II):

wherein ------ represents a macromonomer backbone; I-RG represents a group derived from a polymerization initiator; CTA-RG represents a group derived from a chain transfer agent; RG represents a reactive group derived from a polymerization initiator and a reactive group derived from a chain transfer agent; and PG represents a group having at least one polymerizable group;

(3) The macromonomer mixture of (1) or (2), wherein the reactive group derived from a polymerization initiator and the reactive group derived from a chain transfer agent are each independently at least one kind of functional group selected from the group consisting of a hydroxy group, an amino group, thiol, ester and carboxylic anhydride;

(4) A macromonomer mixture containing at least one kind of macromonomer A having a structure selected from the group consisting of the following general formulas (i1) to (i5):

and at least one kind of macromonomer B having a structure selected from the group consisting of the following general formulas (c1), (c2) and (c3):

wherein $R^1$ to $R^4$ represent a group capable of becoming such a monomer that a monomer expressed by the following general formula (m) has polymerizability:

wherein $R^5$ and $R^6$ represent alkyl having 1 to 20 carbon atoms, or $A^I$; $R^7$ to $R^9$ represent a hydrogen atom, alkyl having 1 to 20 carbon atoms, or $A^I$, provided that (i1) to (i5) each have at least one $A^I$; $R^5$ to $R^9$ may form a ring together; $R^{10}$ and $R^{11}$ represent a hydrogen atom, or alkyl having 1 to 20 carbon atoms, and may form a ring together; and $A^I$ and $A^c$ are each independently a group having 1 to 20 carbon atoms having a radically polymerizable functional group;

(5) The macromonomer mixture of (4), wherein $A^I$ and $A^c$ each are a group having a radically polymerizable functional group selected from the group consisting of acryloyl, methacryloyl, styryl and vinyl;

(6) The macromonomer mixture of (4), wherein $A^I$ and $A^c$ each are a polymerizable group selected from structures expressed by the following formulas (a1) to (a5):

wherein $R^H$ represents H or methyl; X represents O or NH; and $L^1$ and $L^2$ represent a divalent group having 1 to 10 carbon atoms;

(7) The macromonomer mixture of (4), wherein the polymerizable group that a monomer expressed by the general formula (m) has is at least one kind selected from acryloyl, methacryloyl, styryl and vinyl;

(8) The macromonomer mixture of (4), wherein a monomer expressed by the general formula (m) is a hydrophilic monomer;

(9) The macromonomer mixture of any one of (4) to (6), wherein a monomer expressed by the general formula (m) is a monomer selected from the group consisting of N-vinylpyrrolidone, N,N-dimethylacrylamide, vinyl alcohol, (meth)acrylic acid, and 2-hydroxyethyl (meth)acrylate;

(10) A production method of the macromonomer mixture of any one of (1) to (9), wherein after radical polymerization of a hydrophilic monomer using a polymerization initiator having at least one functional group selected from the group consisting of a hydroxy group, an amino group and a carboxyl group in a molecule, and a chain transfer agent having at least one functional group selected from the group consisting of a hydroxy group, an amino group and a carboxyl group in a molecule, a compound having a radically polymerizable functional group is reacted with the resulting polymer mixture;

(11) The production method of the macromonomer mixture of (10), wherein the polymerization initiator is a polymerization initiator expressed by any one of the following formulas (j1) to (j4);

(12) The production method of the macromonomer mixture of (10), wherein the chain transfer agent is a chain transfer agent expressed by any one of the following general formulas (d1) to (d5):

wherein $L^3$ represents a divalent group having 1 to 10 carbon atoms; and $R^{10}$ and $R^{11}$ represent alkyl having 1 to 20 carbon atoms;

(13) A terminal-reactive polymer mixture containing polymer x with a reactive group derived from a polymerization initiator, and polymer y with a reactive group derived from a chain transfer agent;

(14) The terminal-reactive polymer mixture of (13), containing at least one kind of polymer x expressed by the following general formula (III):

and at least one kind of polymer y expressed by the following general formula (IV):

wherein ------ represents a macromonomer backbone; I-RG represents a group derived from a polymerization initiator; CTA-RG represents a group derived from a chain transfer agent; and RG represents a reactive group derived from a polymerization initiator and a reactive group derived from a chain transfer agent;

(15) The terminal-reactive polymer mixture of (13) or (14), wherein the reactive group derived from a polymerization initiator and the reactive group derived from a chain transfer agent are each independently at least one kind of functional group selected from the group consisting of a hydroxy group, an amino group, thiol, ester and carboxylic anhydride;

(16) A terminal-reactive polymer mixture containing at least one kind of polymer x having a structure selected from the group consisting of the following general formulas (x1) to (x5):

and at least one kind of polymer y having a structure expressed by the following general formulas (y1) to (y3):

wherein $R^1$ to $R^4$ represent a group capable of becoming such a monomer that a monomer expressed by the following general formula (m) has polymerizability:

wherein $R^{12}$ and $R^{13}$ represent alkyl having 1 to 20 carbon atoms, or $B^I$; $R^{14}$ to $R^{16}$ represent a hydrogen atom, alkyl having 1 to 20 carbon atoms, or $B^1$, provided that (x1) to (x5) each have at least one $B^I$; $R^{12}$ to $R^{16}$ may form a ring together; $R^{10}$ and $R^{11}$ represent a hydrogen atom, or alkyl having 1 to 20 carbon atoms, and may form a ring together; and $B^I$ and $B^c$ are each independently a group having 1 to 20 carbon atoms having a reactive group;

(17) An intermediate for macromonomer consisting of the terminal-reactive polymer mixture of any one of (13) to (16); and

(18) A silicone hydrogel obtained by copolymerizing at least one kind of silicone monomer with at least one kind of monomer mixture containing the macromonomer mixture of any one of (1) to (9).

According to the present invention, it is possible to obtain a macromonomer mixture which is highly functionalized and has few components not bonded to the main chain, hardly leading to occurrence of deterioration of wettability and leaching. The macromonomer mixture is used suitably in various types of medical devices, particularly contact lenses, intraocular lenses, and artificial corneas.

DETAILED DESCRIPTION

Figure 1:
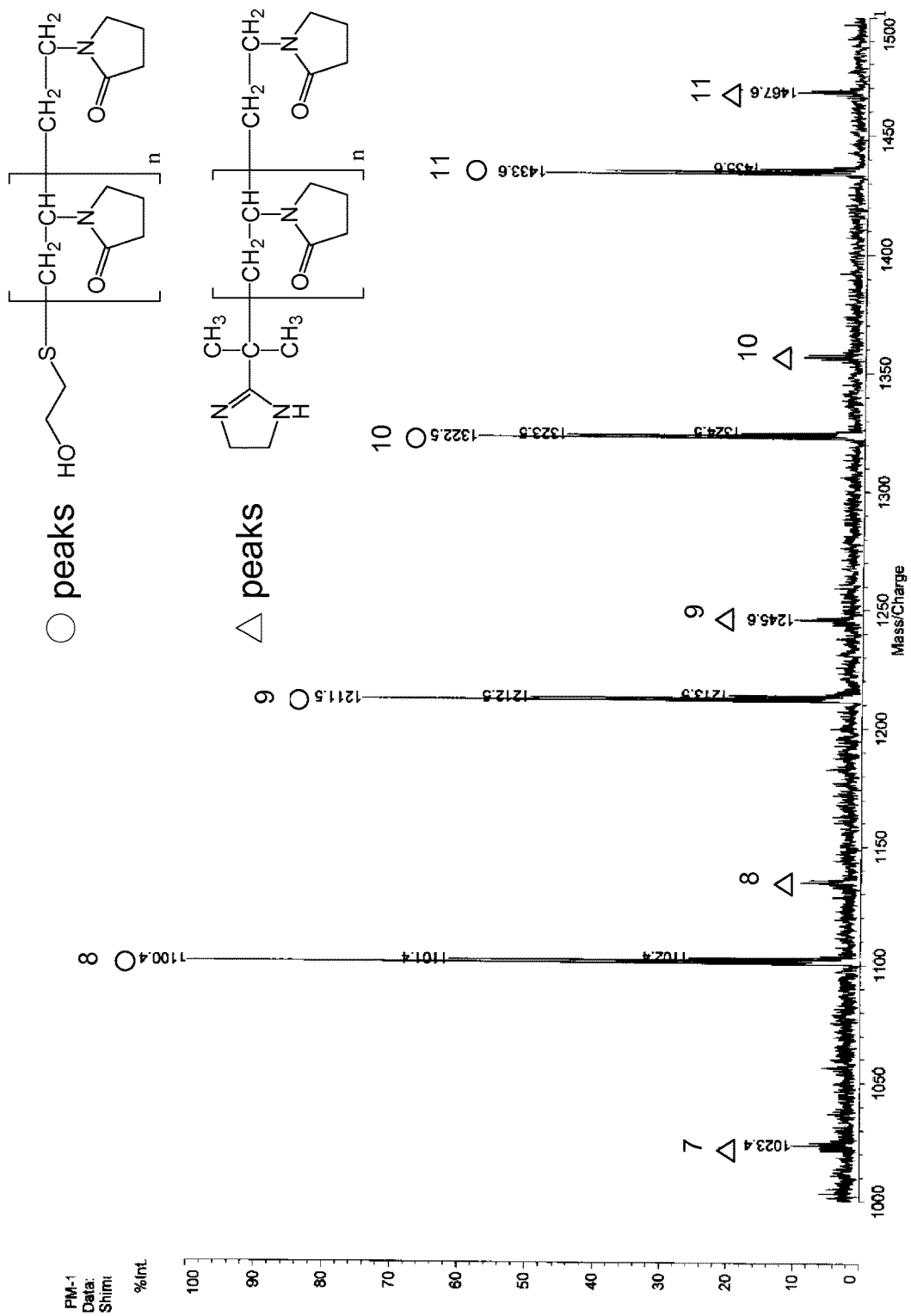
FIG. 1 is a MALDI-MS chart of a polymer before introduction of a polymerizable functional group in Example 4.

The macromonomer mixture of the present invention is characterized by containing macromonomer A being a macromonomer having a group obtained by further introducing a polymerizable group into a reactive group derived from a polymerization initiator at an end thereof; and macromonomer B being a macromonomer having a group obtained by further introducing a polymerizable group into a reactive group derived from a chain transfer agent at an end thereof.

As suitable examples of the reactive group derived from a polymerization initiator and the reactive group derived from a chain transfer agent, a hydroxy group, an amino group, thiol, ester and carboxylic anhydride are mentioned. Among these, from the viewpoints that reactivity is high and introduction of a polymerizable group can be enhanced, a hydroxy group and an amino group are preferable.

As another preferable aspect of the macromonomer mixture of the present invention, there is mentioned a macromonomer mixture characterized by containing at least one kind of macromonomer A expressed by the following general formula (I):

and at least one kind of macromonomer B expressed by the following general formula (II):

In the general formula (I) or (II), ------ represents a macromonomer backbone. The macromonomer backbone is composed of a polymer obtained by polymerization of a radically polymerizable monomer. As a polymerizable group of such a monomer, a substituent having a radically polymerizable functional group selected from the group consisting of acryloyl, methacryloyl, styryl and vinyl is preferable. Among these, from the viewpoint of physical properties of a polymer obtained, acryloyl and vinyl are more preferable, and acryloyl is most preferable.

As a monomer used in the macromonomer backbone, (meth)acrylic acids, (meth)acrylates, (meth)acrylamides, styrenes, N-vinylcarboxylic acid amides, cyclic N-vinylpyridines and N-vinylimidazoles are preferable. Additionally, in the present invention, (meth)acryl represents acryl and methacryl.

As suitable examples in the case that a monomer used in the macromonomer backbone is a silicone monomer, there are mentioned 3-tris(trimethylsiloxy)silylpropyl (meth)acrylate, 3-bis(trimethylsiloxy)methylsilylpropyl (meth)acrylate, mono-methacryloyloxypropyl terminated polydimethylsiloxane and a silicone monomer expressed by the following formulas (s1) to (s3):

The monomer used in the macromonomer backbone is preferably a hydrophilic monomer, and in this case, as suitable examples, there are mentioned N-vinylpyrrolidone, N,N-dimethylacrylamide, 2-hydroxyethyl (meth)acrylate, N-vinylformamide, N-vinylacetamide, (meth)acrylic acid, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinylimidazole, vinyl acetate (after polymerization, it becomes polyvinyl alcohol by hydrolysis), acryloyl morpholine, N,N-diethylacrylamide, N-isopropylacrylamide and the like. Among these, from the viewpoint of balance between hydrophilicity and solubility of a macromonomer mixture obtained, preferable are N-vinylpyrrolidone, N,N-dimethylacrylamide, (meth)acrylic acid, 2-hydroxyethyl (meth)acrylate and vinyl acetate (after polymerization, it becomes polyvinyl alcohol by hydrolysis).

The macromonomer contained in the macromonomer mixture of the present invention may be a polymer copolymerized using a plurality of kinds of monomers used in the macromonomer backbone.

In the general formula (I), I-RG represents a group derived from a polymerization initiator. Here, a group derived from a polymerization initiator denotes a group composed of at least a part of the structure of a polymerization initiator.

In the general formula (II), CTA-RG represents a group derived from a chain transfer agent. Here, a group derived from a chain transfer agent denotes a group composed of at least a part of the structure of a chain transfer agent.

In the general formula (I) or (II), RG represents a reactive group derived from a polymerization initiator, and a reactive group derived from a chain transfer agent. As suitable examples of RG, there are mentioned a hydroxy group, an amino group, thiol, ester and carboxylic anhydride. Among these, from the viewpoints that reactivity is high and introduction of a polymerizable group can be enhanced, a hydroxy group and an amino group are preferable.

In the general formula (I) or (II), PG represents a polymerizable group. Here, a polymerizable group represents a group having 1 to 20 carbon atoms having a radically polymerizable functional group. As suitable examples of the radically polymerizable functional group, (meth)acryloyl, styryl, vinyl and the like are mentioned. Among these, from the viewpoint of polymerizability of a macromonomer mixture obtained, (meth)acryloyl is most preferable. Further, as the specific structure, a substituent expressed by the following general formulas (b1) to (b6) is mentioned:

In the general formulas (b1) to (b6), $R^H$ represents H or methyl.

In the general formulas (b1) to (b6), X represents O or NH.

In the general formulas (b1) to (b6), $L^1$ represents a divalent group having 1 to 10 carbon atoms. It is more preferably alkylene and arylene having 1 to 10 carbon atoms. As the suitable examples, there are mentioned methylene, ethylene, propylene, butylene, pentylene, octylene, decylene, phenylene and the like. The alkylene and arylene may be branched or linear. Among these, more preferable are methylene, ethylene, propylene and butylene, and ethylene is most preferable.

In the general formula (b6), $R^N$ represents hydrogen or a substituent with 1 to 20 carbon atoms. It is more preferably hydrogen, or alkyl or aryl having 1 to 10 carbon atoms. As the suitable examples, there are mentioned hydrogen, methyl, ethyl, n-propyl, i-propyl, n-butyl, s-butyl, t-butyl, n-pentyl, i-pentyl, s-pentyl, neopentyl, hexyl, heptyl, octyl, nonyl, decyl, phenyl, tolyl, xylyl, naphtyl and the like. The alkyl may be branched or linear. Among these, more preferable are hydrogen, methyl, ethyl, n-propyl, i-propyl, n-butyl, s-butyl and t-butyl, and hydrogen and methyl are most preferable.

As another preferable aspect of the macromonomer mixture of the present invention, there is mentioned a macromonomer mixture characterized by containing macromonomer A having a structure selected from the group consisting of the following general formulas (i1) to (i5):

and macromonomer B having a structure selected from the group consisting of the following general formulas (c1) to (c3):

In the general formulas (i1) to (i5) and (c1) to (c3), $R^1$ to $R^4$ and a monomer expressed by the following general formula (m) are the same as in the case of (x1) to (X5) and (y1) to (y3):

In the general formulas (i1) to (i5), $R^5$ and $R^6$ represent alkyl having 1 to 20 carbon atoms, or $A^I$. As suitable examples in the case that $R^5$ and $R^6$ are alkyl having 1 to 20 carbon atoms, there are mentioned methyl, ethyl, n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl, and the like. The alkyl may be branched or linear. Among these, more preferable are methyl, ethyl, n-propyl, i-propyl, n-butyl, s-butyl and t-butyl, and methyl is most preferable.

In the general formulas (i1) to (i5), $A^I$ is a substituent having 1 to 20 carbon atoms being a substituent having a radically polymerizable functional group. As suitable examples of the radically polymerizable functional group, (meth)acryloyl, styryl, vinyl and the like are mentioned, and among these, from the viewpoint of polymerizability of a macromonomer mixture obtained, (meth)acryloyl is most preferable. Further, as the specific structure, a substituent expressed by the following general formulas (a1) to (a5) is mentioned:

In the general formulas (a1) to (a5), $R^H$ represents H or methyl.

In the general formulas (a1) to (a5), X represents O or NH.

In the general formulas (a1) to (a5), $L^1$ and $L^2$ represent a divalent group having 1 to 10 carbon atoms. It is more preferably alkylene and arylene having 1 to 10 carbon atoms. As the suitable examples, there are mentioned methylene, ethylene, propylene, butylene, pentylene, octylene, decylene, phenylene and the like. The alkylene and arylene may be branched or linear. Among these, preferable are methylene, ethylene, propylene and butylene, and ethylene is most preferable.

In the general formulas (i2) to (i5), $R^7$ to $R^9$ represent H or alkyl having 1 to 20 carbon atoms, or $A^I$. In this regard, (i1) to (i5) each are a monomer having at least one $A^I$. As suitable examples in the case that $R^7$ to $R^9$ are H or alkyl having 1 to 20 carbon atoms, there are mentioned H, methyl, ethyl, propyl. n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl and the like. The alkyl may be branched or linear. Among these, more preferable are methyl, ethyl, propyl, n-propyl, i-propyl, n-butyl, s-butyl and t-butyl, and H, methyl and n-butyl are most preferable.

In the general formulas (i2) to (i5), $R^5$ to $R^9$ may form a ring together. As a suitable example, the case that —$R^8$—$R^9$— is ethylene, propylene or butylene is mentioned. Among these, from the viewpoint of stability of a ring formed, the case that —$R^8$—$R^9$— is ethylene is most preferable.

In the general formula (c2), $R^{10}$ and $R^{11}$ are the same as in the case of the general formula (y2).

In the general formulas (c1) to (c3), $A^c$ represents a substituent having 1 to 20 carbon atoms being a substituent having a radically polymerizable functional group. As suitable examples of the radically polymerizable functional group in $A^c$, (meth)acryloyl, styryl and vinyl are mentioned, and among these, from the viewpoint of polymerizability of a macromonomer mixture obtained, (meth)acryloyl is most preferable. As a more specific example, a structure expressed by the following general formulas (a1) to (a5) is mentioned:

In the general formulas (a1) to (a5), $R^H$ represents H or methyl.

In the general formulas (a1) to (a5), X represents O or NH.

In the general formulas (a1) to (a5), $L^1$ and $L^2$ represent a divalent group having 1 to 10 carbon atoms. It is more preferably alkylene and arylene having 1 to 20 carbon atoms. As the suitable examples, there are mentioned methylene, ethylene, propylene, butylene, pentylene, octylene, decylene, phenylene and the like. The alkylene and arylene may be branched or linear.

As a more specific example of the macromonomer A of the present invention, a structure expressed by the following general formulas (e1) to (e6) is mentioned:

Among these, from the viewpoints that there is no need to use a condensation reagent hard to remove completely in introducing a polymerizable functional group, and synthesis is possible by the combination of a highly reactive amino group, a hydroxy group with isocyanate and (meth)acrylic acid halide, preferable one in the point of being capable of introducing a polymerizable functional group highly is a structure expressed by the general formulas (e1) to (e5), further from the viewpoint of high reactivity, more preferable one is the formulas (e1) to (e3), and a structure obtainable by an initiator having an amino group, and from the viewpoint of producing no salt in reaction, the most preferable one is a structure expressed by the formula (e1), and a structure expressed by the formula (e2) created due to its hydrolysis. The structure expressed by the formula (e1) is sometimes hydrolyzed, and for example, in the case of using the macromonomer mixture of the present invention in an ophthalmic lens, it may be changed to a structure expressed by the formula (e2) due to heating in boiling sterilization. The structure of the formula (e2) is preferable because it is more stable to hydrolysis.

As a more specific example of the macromonomer B of the present invention, a structure expressed by the following general formulas (f1) to (f5) is mentioned:

Among these, from the viewpoints that there is no need to use a condensation reagent hard to remove completely in introducing a polymerizable functional group, and synthesis is possible by the combination of highly reactive amino group, a hydroxy group with isocyanate and (meth)acrylic acid halide, preferable one in the point of being capable of introducing a polymerizable functional group highly is a structure of (f1) to (f4), and from the viewpoint of producing no salt in reaction, the most preferable one is a structure expressed by the formulas (f1) and (f2).

The molecular weight of the macromonomer mixture of the present invention is preferably 1000 to 2000000, more preferably 10000 to 1000000, and most preferably 200000 to 800000 since there arises a problem that when it is too small, physical properties of the macromonomer mixture is not sufficiently exhibited and when it is too large, viscosity of the polymerization mixture becomes high and solubility becomes low.

In obtaining the macromonomer mixture of the present invention, as a functionalization agent for introducing a polymerizable functional group of the macromonomer, it is possible to use a compound having a polymerizable group and further having a functional group capable of reacting with a functional group of the polymerization initiator and the chain transfer agent. As the suitable examples, (meth)acrylic acid chloride, 2-isocyanatoethyl methacrylate, (meth)acrylic anhydride and 2-hydroxyethyl (meth)acrylate are mentioned. Among these, (meth)acrylic acid chloride, 2-isocyanatoethyl (meth)acrylate, and (meth)acrylic anhydride are preferable because of high reactivity, and further, 2-isocyanatoethyl (meth)acrylate is most preferable because it has no leaving group.

The silicone hydrogel of the present invention is obtained by copolymerization of at least one kind of silicone monomer with the macromonomer mixture of the present invention.

As examples of a silicone monomer used in the silicone hydrogel of the present invention, there are mentioned 3-tris(trimethylsiloxy)silylpropyl (meth)acrylate, 3-bis(trimethylsiloxy)methylsilylpropyl (meth)acrylate, mono-methacryloyloxypropyl terminated polydimethylsiloxane, and a silicone monomer expressed by the following formulas (s1) to (s3);

The terminal-reactive polymer mixture of the present invention is characterized by containing polymer x having a reactive group derived from a polymerization initiator, and a polymer y having a reactive group derived from a chain transfer agent.

As suitable examples of the reactive group derived from a polymerization initiator and the reactive group derived from a chain transfer agent, a hydroxy group, an amino group, thiol, ester and carboxylic anhydride are mentioned. Among these, from the viewpoints that reactivity is high and introduction of a polymerizable group can be enhanced, a hydroxy group and an amino group are preferable.

As another preferable aspect of the terminal-reactive polymer mixture of the present invention, there is mentioned a terminal-reactive polymer mixture characterized by containing at least one kind of polymer x expressed by the following general formula (III):

and at least one kind of polymer y expressed by the following general formula (IV):

In the general formula (III) or (IV), ------ represents a terminal-reactive polymer backbone. The terminal-reactive polymer backbone is composed of a polymer obtained by polymerization of a radically polymerizable monomer. As a polymerizable group of such a monomer, a substituent having a radically polymerizable functional group selected from the group consisting of acryloyl, methacryloyl, styryl and vinyl is preferable. Among these, from the viewpoint of physical properties of a polymer obtained, acryloyl and vinyl are more preferable, and acryloyl is most preferable.

As a monomer used in the terminal-reactive polymer backbone, (meth)acrylic acids, (meth)acrylates, (meth)acrylamides, styrenes, N-vinylcarboxylic acid amides, cyclic N-vinylpyridines and N-vinylimidazoles are preferable.

As suitable examples in the case that a monomer used in the terminal-reactive polymer backbone is a silicone monomer, there are mentioned 3-tris(trimethylsiloxy)silylpropyl (meth)acrylate, 3-bis(trimethylsiloxy)methylsilylpropyl (meth)acrylate, mono-methacryloyloxypropyl terminated polydimethylsiloxane and a silicone monomer expressed by the following formulas (s1) to (s3):

The monomer used in the terminal-reactive polymer backbone is preferably a hydrophilic monomer, and in this case, as suitable examples, there are mentioned N-vinylpyrrolidone, N,N-dimethylacrylamide, 2-hydroxyethyl (meth)acrylate, N-vinylformamide, N-vinylacetamide, (meth)acrylic acid, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinylimidazole, vinyl acetate (after polymerization, it becomes polyvinyl alcohol by hydrolysis), acryloyl morpholine, N,N-diethylacrylamide, N-isopropylacrylamide and the like. Among these, from the viewpoint of balance between hydrophilicity and solubility of a macromonomer mixture obtained, preferable are N-vinylpyrrolidone, N,N-dimethylacrylamide, (meth)acrylic acid, 2-hydroxyethyl (meth)acrylate and vinyl acetate (after polymerization, it becomes polyvinyl alcohol by hydrolysis).

The macromonomer contained in a polymer contained in the terminal-reactive polymer mixture of the present invention may be a polymer copolymerized using a plurality of kinds of monomers used in the macromonomer backbone.

In the general formula (III), I-RG represents a group derived from a polymerization initiator. Here, a group derived from a polymerization initiator denotes a group composed of at least a part of the structure of a polymerization initiator.

In the general formula (IV), CTA-RG represents a group derived from a chain transfer agent. Here, a group derived from a chain transfer agent denotes a group composed of at least a part of the structure of a chain transfer agent.

In the general formula (III) or (IV), RG represents a reactive group derived from a polymerization initiator, and a reactive group derived from a chain transfer agent. As suitable examples of RG, there are mentioned a hydroxy group, an amino group, thiol, ester and carboxylic anhydride. Among these, from the viewpoints that reactivity is high and introduction of a polymerizable group can be enhanced, a hydroxy group and an amino group are preferable.

As another preferable aspect of the terminal-reactive polymer mixture of the present invention, there is mentioned a terminal-reactive polymer mixture composed of polymer x having a structure selected from the group consisting of the following general formulas (x1) to (x5):

and polymer y having a structure selected from the group consisting of the following general formulas (y1) to (y3);

In the general formulas (x1) to (x5) and (y1) to (y3), $R^1$ to $R^4$ represent a group in which a monomer expressed by the following general formula (m) can become a monomer having polymerizability:

As a polymerizable group of a monomer expressed by the general formula (m), a substituent having a radically polymerizable functional group selected from the group consisting of acryloyl, methacryloyl, styryl and vinyl is preferable. Among these, from the viewpoint of physical properties of a polymer obtained, acryloyl and vinyl are more preferable, and acryloyl is most preferable.

As a monomer expressed by the general formula (m), (meth)acrylic acids, (meth)acrylates, (meth)acrylamides, styrenes, N-vinylcarboxylic acid amides, cyclic N-vinylpyridines and N-vinylimidazoles are preferable.

As suitable examples in the case that a monomer expressed by the general formula (m) is a silicone monomer, there are mentioned 3-tris(trimethylsiloxy)silylpropyl(meth)acrylate, 3-bis(trimethylsiloxy)methylsilylpropyl(meth)acrylate, mono-methacryloyloxypropyl terminated polydimethylsiloxane and a silicone monomer expressed by the following formulas (s1) to (s3):

The monomer expressed by the general formula (m) is preferably a hydrophilic monomer, and in this case, as suitable examples, there are mentioned N-vinylpyrrolidone, N,N-dimethylacrylamide, 2-hydroxyethyl(meth)acrylate, N-vinylformamide, N-vinylacetamide, (meth)acrylic acid, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinylimidazole, vinyl acetate (after polymerization, it becomes polyvinyl alcohol by hydrolysis), acryloyl morpholine, N,N-diethylacrylamide, N-isopropylacrylamide and the like. Among these, from the viewpoint of balance between hydrophilicity and solubility of a macromonomer mixture obtained, preferable are N-vinylpyrrolidone, N,N-dimethylacrylamide, (meth)acrylic acid, 2-hydroxyethyl (meth)acrylate and vinyl acetate (after polymerization, it becomes polyvinyl alcohol by hydrolysis).

A polymer contained in the terminal-reactive polymer mixture and a macromonomer contained in the macromonomer mixture of the present invention may each be a polymer copolymerized using a plurality of kinds of monomers expressed by the formula (m).

In the general formulas (x1) to (x5), $R^{12}$ and $R^{13}$ represent alkyl having 1 to 20 carbon atoms, or $B^r$. As suitable examples in the case that $R^{12}$ and $R^{13}$ are alkyl having 1 to 20 carbon atoms, there are mentioned methyl, ethyl, n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl, and the like. The alkyl may be branched or linear. Among these, more preferable are methyl, ethyl, n-propyl, i-propyl, n-butyl, s-butyl and t-butyl, and methyl is most preferable.

In the general formulas (x1) to (x5), $B^1$ is a substituent having 1 to 20 carbon atoms having a reactive group. As suitable examples of the reactive group, a hydroxy group, an amino group and a carboxyl group are mentioned. Among these, from the viewpoint of reactivity, a hydroxy group and an amino group are more preferable, and an amino group is most preferable.

In the general formulas (x2) to (x5), $R^{14}$ to $R^{16}$ represent H or alkyl having 1 to 20 carbon atoms, or $B^r$. In this regard, (x1) to (x5) each are monomer having at least one $B^r$. As suitable examples in the case that $R^{14}$ to $R^{16}$ are H or alkyl having 1 to 20 carbon atoms, there are mentioned H, methyl, ethyl, propyl, n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl, and the like. The alkyl may be branched or linear. Among these, more preferable are methyl, ethyl, propyl, n-propyl, i-propyl, n-butyl, s-butyl and t-butyl, and H, methyl and n-butyl are most preferable.

In the general formulas (x2) to (x5), $R^{12}$ to $R^{16}$ may form a ring together. As a suitable example, the case that —$R^{15}$—$R^{16}$— is ethylene, propylene and butylene is mentioned. Among these, from the viewpoint of stability of a ring formed, the case that —$R^{15}$—$R^{16}$— is ethylene is most preferable.

In the general formula (y2), $R^{10}$ and $R^{11}$ represent a hydrogen atom or alkyl having 1 to 20 carbon atoms, and may form a ring together. As suitable examples, there are mentioned, methyl, ethyl, propyl, n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl, and the like. The alkyl may be branched or linear. Among these, from the viewpoints of being less sterically hindered and easy occurrence of chain transfer, methyl, ethyl and propyl are preferable. As suitable examples in the case of forming a ring together, the case that —$R^{10}$—$R^{11}$— is ethylene, propylene, butylene, pentylene, hexylene and the like is mentioned. Among these, from the viewpoint of stability in a ring formed, butylene and pentylene are preferable.

In the general formulas (y1) to (y3), $B^c$ is a substituent having 1 to 20 carbon atoms having a reactive group. As suitable examples of the reactive functional group, a hydroxy group, an amino group and a carboxyl group are mentioned. Among these, from the viewpoint of reactivity, a hydroxy group and an amino group are more preferable, and a hydroxy group is most preferable.

The terminal-reactive polymer mixture of the present invention is a mixture of a plurality of kinds of polymers having a reactive group at one end, and has a feature that it is capable of lowering the content of the polymer not having a functional group in the mixture.

The terminal-reactive polymer mixture of the present invention is suitable for intermediates in various types of polymer products by utilizing reactivity of the end, and for modifying agents of various products (for example, surface treatment agents and coating materials). Above all, it is suitable for an intermediate for macromonomer.

A polymerization initiator, which is used to obtain the terminal-reactive polymer mixture and the macromonomer mixture of the present invention by radical polymerization, has at least one functional group selected from the group consisting of a hydroxy group, an amino group and a carboxyl group in a molecule.

As a suitable example, a polymerization initiator expressed by the following general formulas (j1) to (j4): can be mentioned.

Of the above, from the viewpoint of high reactivity in the initiator-end of a polymer obtained, a polymerization initiator expressed by the formulas (j1) to (j3) having a hydroxy group or an amino group in a molecule is more preferable, and a polymerization initiator expressed by the formula (j1) having an amino group in a molecule is most preferable. The use amount should be suitably adjusted according to a target molecular weight of the terminal-reactive polymer mixture and the macromonomer mixture to be obtained. When the amount is too small, polymerization does not start, whereas when it is too large, the molecular weight becomes too low, or because recombination termination tend to occur, a polymer or a macromonomer having functional groups at both ends tends to be produced. Thus, the amount is preferably 0.001 to 5 mol %, more preferably 0.005 to 3 mol %, and most preferably 0.01 to 1 mol % relative to the monomer.

A chain transfer agent, which is used to obtain the terminal-reactive polymer mixture and the macromonomer mixture of the present invention by radical polymerization, preferably has at least one functional group selected from the group consisting of a hydroxy group, an amino group and a carboxyl group in a molecule. As a suitable example, a chain transfer agent expressed by the following general formulas (d1) to (d5) is mentioned:

Among these, since it has an amino group or a hydroxy group that easily causes chain transfer and has high reactivity, from the viewpoint that a polymerizable functional group can be introduced highly, a chain transfer agent expressed by (d1) or (d2) is preferable.

In the formulas (d1) to (d5), $L^3$ represents a divalent group having 1 to 10 carbon atoms. It is more preferably alkylene and arylene having 1 to 20 carbon atoms. As the examples, there are mentioned methylene, ethylene, propylene, butylene, pentylene, octylene, decylene, phenylene and the like. The alkylene and arylene may be branched or linear. Among these, from the viewpoints of being less sterically hindered and easy occurrence of chain transfer, ethylene and propylene are most preferable.

In the general formulas (d1) to (d5), $R^{10}$ and $R^{11}$ represent alkyl having 1 to 20 carbon atoms. As the examples, there are mentioned methyl, ethyl, propyl, n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl, and the like. The alkyl may be branched or linear. Among these, from the viewpoints of being less sterically hindered and easy occurrence of chain transfer, methyl, ethyl and propyl are preferable. As suitable examples of —$R^{10}$—$R^{11}$— in the case that $R^{10}$ and $R^{11}$ form a ring together, there are mentioned ethylene, propylene, butylene, pentylene, hexylene, heptylne, octylene, nonylene, decylene, docecylene and icosylene. Among these, from the viewpoint of stability of a ring formed, butylene and pentylene are preferable.

As suitable examples of a chain transfer agent used in obtaining the terminal-reactive polymer mixture and the macromonomer mixture of the present invention, there are mentioned 2-mercaptoethanol, 2-aminoethanethiol, 2-aminoethanethiol hydrochloride, 2-thiopropionic acid and the like. Among these, from the viewpoint of high reactivity at an end of a chain transfer agent obtained, 2-mercaptoethanol, 2-aminoethanethiol and 2-aminoethanethiol hydrochloride are most preferable. The use amount should be suitably adjusted according to a target molecular weight of the macromonomer mixture to be obtained. When the amount is too large, since the unreacted chain transfer agent tends to remain in the system, it is preferably 0.01 to 50 mol %, more preferably 0.05 to 40 mol %, and most preferably 0.1 to 25 mol % relative to the monomer.

In obtaining the terminal-reactive polymer mixture and the macromonomer mixture of the present invention by polymerization, a polymerization solvent can be used. As the solvent, various types of organic or inorganic solvents can be adopted. For example, there are various kinds of alcohol solvents such as water, methanol, ethanol, propanol, 2-propanol, butanol, tert-butanol, tert-amyl alcohol, 3-methyl-3-pentanol, 3,7-dimethyl-3-octanol and tetrahydrolinalool; various kinds of aromatic hydrocarbon solvents such as benzene, toluene and xylene; various kinds of aliphatic hydrocarbon solvents such as hexane, heptane, octane, decane, petroleum ether, kerosene, ligroin and paraffin; various kinds of ketone solvents such as acetone, methyl ethyl ketone and methyl isobutyl ketone; various kinds of ester solvents such as ethyl acetate, butyl acetate, methyl benzoate, dioctyl phthalate and ethylene glycol diacetate; various kinds of glycol ether solvents such as diethyl ether, tetrahydrofuran, dioxane, ethylene glycol dialkyl ether, diethylene glycol dialkyl ether, triethylene glycol dialkyl ether, tetraethylene glycol dialkyl ether, polyethylene glycol dialkyl ether, polyethylene glycol-polypropylene glycol block copolymer, and polyethylene glycol-polypropylene glycol random copolymer; various kinds of amide solvents such as N,N-dimethylformamide, N,N-dimethylacetamide and N-methylpyrrolidone; and dimethylsulfoxide, and these can be used alone or in combination. Among these, from the viewpoint of hard to inhibit radical polymerization, more preferable are water, tert-butanol, tert-amyl alcohol, 3-methyl-3-pentanol and 3,7-dimethyl-3-octanol.

In obtaining the terminal-reactive polymer mixture and the macromonomer mixture of the present invention, the concentration of monomer in the case of using a polymerization solvent is preferably 10% by weight to 80% by weight, more preferably 15% by weight to 65% by weight, and most preferably 20% by weight to 50% by weight, since when it is too low, a sufficient molecular weight cannot be obtained, whereas when it is too high, there is a danger of overdrive due to polymerization heat.

When the content of a silicone component in the silicone hydrogel is too small, oxygen permeability necessary to wear an ophthalmic lens continuously is not obtained, whereas when it is too large, compatibility with a hydrophilic component tends to be hardly obtained. Thus, given that the total weight of various monomers is 100 parts by weight, the content of a silicone monomer is preferably 20 to 80 parts by weight, more preferably 30 to 80 parts by weight, and most preferably 50 to 80 parts by weight.

The silicone hydrogel of the present invention may contain a hydrophilic monomer as a copolymerization component. As a hydrophilic monomer to be copolymerized, it is not particularly restricted as long as it is polymerizable, and there can be used a monomer having (meth)acryloyl, styryl, allyl, vinyl, and other polymerizable carbon-carbon unsaturated bonds.

Hereinafter, several examples of the monomer are mentioned, but the present invention is not limited thereto: carboxylic acids such as (meth)acrylic acid, itaconic acid, crotonic acid and vinylbenzoic acid, (meth)acrylates having a hydroxy group such as 2-hydroxyethyl (meth)acrylate, (meth)acrylamides such as N,N-dimethylacrylamide, and N-vinylpyrrolidone, N-vinylimidazole and the like.

In obtaining the silicone hydrogel of the present invention by polymerization, from the viewpoints of obtaining good mechanical properties and good resistance to a disinfectant and a washing liquid, it is preferable to use a monomer having at least two copolymerizable carbon-carbon unsaturated bonds in a molecule as a copolymerization component. The copolymerization ratio of a monomer having at least two copolymerizable carbon-carbon unsaturated bonds in a molecule is preferably 0.1 to 20% by weight, more preferably 0.3 to 15% by weight, and further preferably 0.5 to 10% by weight.

The silicone hydrogel of the present invention may contain a UV absorber, a dye, a colorant and the like. They may be contained in a form that the UV absorber, the dye and the colorant having a polymerizable group are copolymerized.

In obtaining the silicone hydrogel of the present invention by polymerization, for making polymerization easy, it is preferable to add a thermal polymerization initiator typified by a peroxide and an azo compound, and a photopolymerization initiator. In the case of carrying out thermal polymerization, a thermal polymerization initiator with optimal decomposition characteristics to a desired reaction temperature is selected and used. In general, an azo initiator and a peroxide initiator with a 10-hour half-life period temperature of 40° C. to 120° C. are suitable. As a photopolymerization initiator, there can be mentioned a carbonyl compound, a peroxide, an azo compound, a sulfur compound, a halide, a metal salt and the like. These polymerization initiators are used alone or in combination, and used up to about 1 part by weight relative to 100 parts by weight of the monomer component.

In obtaining the silicone hydrogel of the present invention by polymerization, a polymerization solvent can be used. As the solvent, various types of organic or inorganic solvents can be adopted. For example, there are water, various kinds of alcohol solvents such as methanol, ethanol, propanol, 2-propanol, butanol, tert-butanol, tert-amyl alcohol, 3,7-dimethyl-3-octanol and tetrahydrolinalool; various kinds of aromatic hydrocarbon solvents such as benzene, toluene and xylene; various kinds of aliphatic hydrocarbon solvents such as hexane, heptane, octane, decane, petroleum ether, kerosene, ligroin and paraffin; various kinds of ketone solvents such as acetone, methyl ethyl ketone and methyl isobutyl ketone; various kinds of ester solvents such as ethyl acetate, butyl acetate, methyl benzoate, dioctyl phthalate and ethylene glycol diacetate; various kinds of glycol ether solvents such as diethyl ether, tetrahydrofuran, dioxane, ethylene glycol dialkyl ether, diethylene glycol dialkyl ether, triethylene glycol dialkyl ether, tetraethylene glycol dialkyl ether, polyethylene glycol dialkyl ether, polyethylene glycol-polypropylene glycol block copolymer and polyethylene glycol-polypropylene glycol random copolymer; various kinds of amide solvents such as N,N-dimethylformamide, N,N-dimethylacetamide and N-methylpyrrolidone; and dimethylsulfoxide and these can be used alone or in combination. Among these, alcohol solvents and glycol ether solvents are preferable from the viewpoint that they can be easily removed by washing with water from the medial materials obtained.

The silicone hydrogel of the present invention can be molded independently into a desired shape and used, and it can also be molded after being mixed with other materials. It is also suitable to apply coating to the surface of a molded product.

In the case of molding the silicone hydrogel of the present invention to use as an ophthalmic lens, the following methods can be usually used as the polymerization method and the forming method. For example, there can be mentioned a method where the silicone hydrogel is once formed into a round bar or a plate and this is processed into a desired shape by cutting work or the like, a mold polymerization method, spin casting method and the like.

As one example, a case where an ophthalmic lens made from the silicone hydrogel of the present invention is obtained by a mold polymerization method will be explained below.

A monomer composition is filled in a space between two molds having a lens shape. Photopolymerization or thermal polymerization is carried out to form a lens shape. The mold is made from a resin, glass, ceramic, a metal or the like. In the case of photopolymerization, an optically transparent material is used, and usually, a resin or glass is used. When an ophthalmic lens is produced from a silicone hydrogel, in many cases, a space is formed by two facing molds, and a monomer composition is filled in the space. Subsequently, the molds with the monomer composition filled in the space are irradiated with an active ray such as UV, or heated in an oven or a liquid tank to polymerize the monomer. It is also possible to use a method concomitantly using both, where heat polymerization is carried out after photopolymerization, or photopolymerization is carried out after heat polymerization. In the case of photopolymerization, generally, for example, light including much UV from a mercury lamp or an insect trapping lamp as a light source is irradiated for a short time (usually hour or less). In the case of carrying out thermal polymerization, a condition that the temperature is raised gradually from around room temperature to a temperature of 60° C. to 200° C. over several hours to several tens of hours is preferred for maintaining optical homogeneity and quality of the polymer and increasing reproducibility.

The silicone hydrogel of the present invention can undergo modifying treatment by various methods. As a specific modifying method, there can be mentioned electromagnetic wave (including light) irradiation, plasma irradiation, chemical vapor deposition treatment such as evaporation coating and sputtering, heating, base treatment, acid treatment, use of other suitable surface treatment agents and the combination of these.

Oxygen permeability of the silicone hydrogel of the present invention is preferably $70 \times 10^{-11}$ (m/sec)mLO$_2$/(mL·hPa) or more in terms of oxygen permeability coefficient.

The dynamic contact angle (advancing contact angle) of the silicone hydrogel of the present invention is preferably 90° or less, more preferably 75° or less, and most preferably 60° or less.

The silicone hydrogel of the present invention is suitable for medical devices such as ophthalmic lenses, endoscopes, catheters, transfusion tubes, gas transfer tubes, stents, sheaths, cuffs, tube connecters, access ports, drainage bags, blood circuits, wound covering materials and various types of medicine carriers, above all, contact lenses, intraocular lenses, and artificial corneas.

EXAMPLES

Hereinafter, the present invention is specifically explained by means of examples, but the present invention is not limited thereto.

Analysis Method (1) Gel Permeation Chromatography (GPC) Measurement (Tables 1, 3 and 5)

GPC measurement of Tables 1, 3 and 5 was conducted under the following conditions.

Apparatus: Tosoh Corporation HLC-8220 GPC
Column: TSKgel SUPER HM-H, two pieces (particle diameter: 5 μm, 6.0 mm ID×15 cm)
Moving phase: N-methylpyrrolidone (10 mM LiBr)
Column temperature: 40° C.
Measuring time: 40 minutes
Injection amount: 10 μL
Detector: RI detector
Flow rate: 0.2 mL/min
Sample concentration: 0.4% by weight
Standard sample: Polystyrene (molecular weight 500 to 1090000)

(2) MALDI-MS Measurement

The vicinity of the top of peak in a macromonomer mixture in GPC was fractionated, and MALDI-MS measurement (positive) was carried out by a reflector mode using dithranol as a matrix and trifluoroacetic acid as a cationizing agent.

(3) Dynamic Contact Angle Measurement

As a sample for dynamic contact angle, a film of about 5 mm×10 mm×0.1 mm in size cut out from a film-like sample was used, and a dynamic contact angle in advancing to a borate buffer solution (pH 7.1 to 7.3) was measured. The immersion speed was set to 0.1 mm/sec, and the immersion depth was set to 7 mm.

(4) GPC Measurement (Table 7)

GPC measurement of Table 7 was carried out under the following conditions.

Apparatus: Shimadzu Corporation LC-20AD (pump), RID-20A (RI detector), CTO-20A (column oven)
Column: TSKgel GMPW$_{XL}$ (particle diameter: 13 μm, 7.8 mm ID×30 cm)
Moving phase: Water/Methanol=50/50 (0.1 N LiNO$_3$)
Column temperature: 40° C.
Measuring time: 30 minutes
Injection amount: 100 μL
Detector: RI detector
Flow rate: 0.5 mL/min
Sample concentration: 0.1% by weight
Standard sample: Polyethylene glycol (molecular weight 106 to 1258000)

Example 1

To a three-neck flask of 500 mL were added N-vinylpyrrolidone (NVP, 77.80 g, 0.70 mol), a polymerization initiator expressed by the following formula (j1) (VA-061, Wako Pure Chemical Industries, Ltd., 0.44 g, 1.76 mmol), 2-mercaptoethanol (2-ME, 10.00 g, 128 mmol) and t-amyl alcohol (TAA, 205.89 g), and a three way stopcock, a thermometer and a mechanical stirrer were equipped. The inside of the three-neck flask was deaerated by a vacuum pump, and after argon substitution was repeated three times, the temperature was raised to 75° C., and the mixture was stirred for 7 hours.

After completion of polymerization, the temperature was decreased to room temperature and the polymerization reaction liquid was poured in 900 mL of n-hexane, allowed to stand still, and then the supernatant was removed by decantation. The residue was washed twice with n-hexane/ethanol=450 mL/20 mL. The solid content was dried by a vacuum dryer at 40° C. for 16 hours. After putting liquid nitrogen, it was pulverized with a spatula and transferred to a bag with a chuck. Drying was conducted by a vacuum dryer at 40° C. for 3 hours, thereby to obtain a terminal-reactive polymer mixture. The molecular weight of the terminal-reactive polymer mixture obtained is as shown in Table 1.

Examples 2 to 4

The same polymerization as in Example 1 was carried out at a charging ratio shown in Table 1. The molecular weight of the terminal-reactive polymer mixture obtained is as shown in Table 1.

Example 5

50 g of the terminal-reactive polymer mixture obtained in Example 1, 15.0 mg of BHT (300 ppm to polymer) and 330 g of 1,4-dioxane were added to a four-neck round-bottom flask of 500 mL. To the four-neck round-bottom flask, a mechanical stirrer, a glass stopper, a connecting tube connected to a nitrogen line and a Claisen tube were equipped, and to the forepart, a Liebig condenser, a distillation adaptor and a recovery flask were connected. While stirring under nitrogen stream, the temperature was raised to 126° C. (bath temperature), and the mixture was maintained at 126° C. till the remaining amount of 1,4-dioxane became about 110 to 120 g, removing water from the reaction system. The temperature was decreased to 90° C. 30 μL of Dibutyltin (IV) dilaurate and 1.581 g of 2-isocyanatoethyl methacrylate (MOI) were added thereto under nitrogen stream, and reacted at 90° C. for 3 hours.

After completion of reaction, the temperature was decreased to 70° C., and 20 g of ethanol was added and the mixture was stirred for 60 minutes. After cooling to room temperature, the polymerization reaction liquid was poured in 600 mL/10 mL of n-hexane/methanol. The supernatant was removed by decantation. The residue was washed twice with n-hexane/methanol=400 mL/20 mL. The solid content was dried by a vacuum dryer at 40° C. for 16 hours. After putting liquid nitrogen, it was pulverized with a spatula and transferred to a bag with a chuck. Drying was conducted by a vacuum dryer at 40° C. for 3 hours, thereby to obtain a macromonomer mixture.

Examples 6 to 8

Using the terminal-reactive polymer mixtures obtained in Examples 2 to 4, the same functionalization as in Example 5 was carried out by a MOI amount of Table 2.

Comparative Example 1

The same polymerization as in Example 1 was carried out except that the polymerization initiator VA-061 was replaced with a polymerization initiator (ADVN Wako Pure Chemical Industries, Ltd.) expressed by the following formula (j0) and the charging ratio was changed to one shown in Table 1.

TABLE 1

| | NVP (g) | Initiator (g) | 2-ME (g) | TAA (g) | Mn (kD) | Mw (kD) |
|---|---|---|---|---|---|---|
| Example 1 | 77.80 | VA-061 0.44 | 10.00 | 205.89 | 48 | 129 |
| Example 2 | 77.80 | VA-061 0.44 | 0.68 | 184.16 | 48 | 161 |
| Example 3 | 77.80 | VA-061 0.44 | 2.50 | 121.11 | 26 | 81 |
| Example 4 | 77.80 | VA-061 1.78 | 5.00 | 197.28 | 13 | 30 |
| Comparative Example 1 | 77.80 | ADVN 2.00 | 5.00 | 109.70 | 13 | 36 |

TABLE 2

| | Terminal-reactive polymer mixture | (g) | MOI (g) |
|---|---|---|---|
| Example 5 | Example 1 | 50.00 | 1.581 |
| Example 6 | Example 2 | 50.00 | 1.581 |
| Example 7 | Example 3 | 50.00 | 1.443 |
| Example 8 | Example 4 | 50.00 | 2.635 |

Example 9

In regard to the terminal-reactive polymer mixture of Example 4, a fraction obtained by fractionating the vicinity of the top of main peak in GPC was concentrated and MALDI-MS measurement was carried out. The MALDI-MS chart of the terminal-reactive polymer mixture of Example 4 is shown in FIG. 1. As a result, the terminal-reactive polymer mixture of Example 4 had reactive groups in both the polymer with a chain transfer agent-end and polymer with an initiator-end, and it was confirmed that a target macromonomer mixture was obtained by introducing a polymerizable group.

Comparative Example 2

Figure 2:
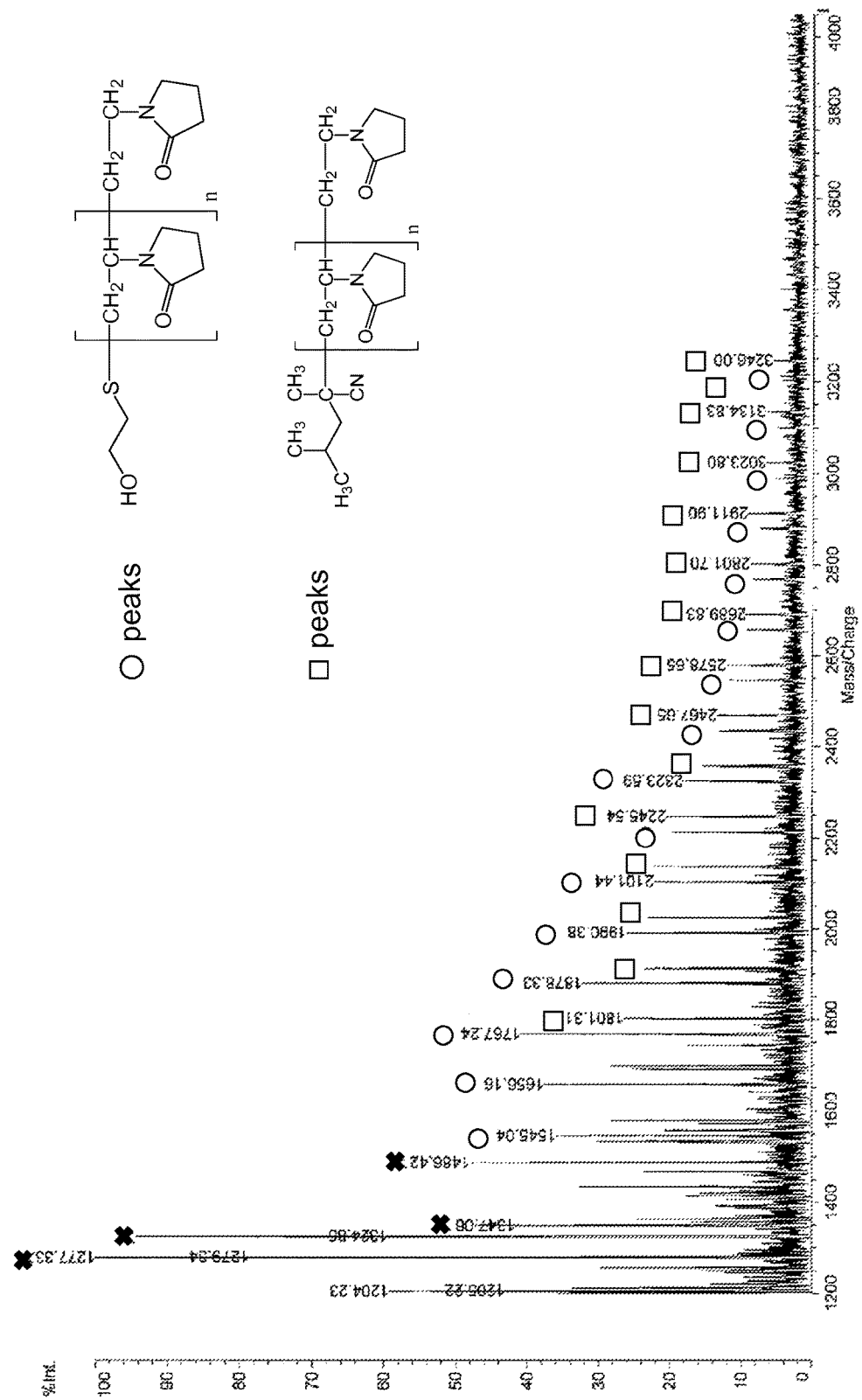
FIG. 2 is a MALDI-MS chart of a polymer in Comparative Example 1.

The same MALDI-MS measurement as in Example 6 was carried out except for using the terminal-reactive polymer mixture of Comparative Example 1. The MALDI-MS chart of the terminal-reactive polymer mixture of Comparative Example 1 is shown in FIG. 2. As a result, it was confirmed that the terminal-reactive polymer mixture of Comparative Example 1 contained a polymer having an initiator (ADVN) end and unable to introduce a polymerizable functional group.

Examples 10 to 12

Using N,N-dimethylacrylamide in place of N-vinylpyrolidone, the same polymerization as in Example 1 was carried out at a charging ratio shown in Table 3, thereby to obtain a terminal-reactive polymer mixture.

TABLE 3

| | DMA (g) | VA-061 (g) | 2-ME (g) | TAA (g) | Mn (kD) | Mw (kD) |
|---|---|---|---|---|---|---|
| Example 10 | 99.10 | 0.625 | 7.81 | 250.92 | 7.8 | 19 |
| Example 11 | 99.10 | 0.313 | 1.95 | 236.52 | 21 | 63 |
| Example 12 | 99.10 | 0.156 | 0.98 | 233.87 | 24 | 81 |

Examples 13 to 15

Using the terminal-reactive polymer mixtures obtained in Examples 10 to 12, the same functionalization as in Example 5 was carried out by a MOI amount of Table 4.

TABLE 4

| | Terminal-reactive polymer mixture | | MOI (g) |
|---|---|---|---|
| Example 13 | Example 10 | 50.00 | 2.635 |
| Example 14 | Example 11 | 50.00 | 1.581 |
| Example 15 | Example 12 | 50.00 | 1.581 |

Example 16

Figure 3:
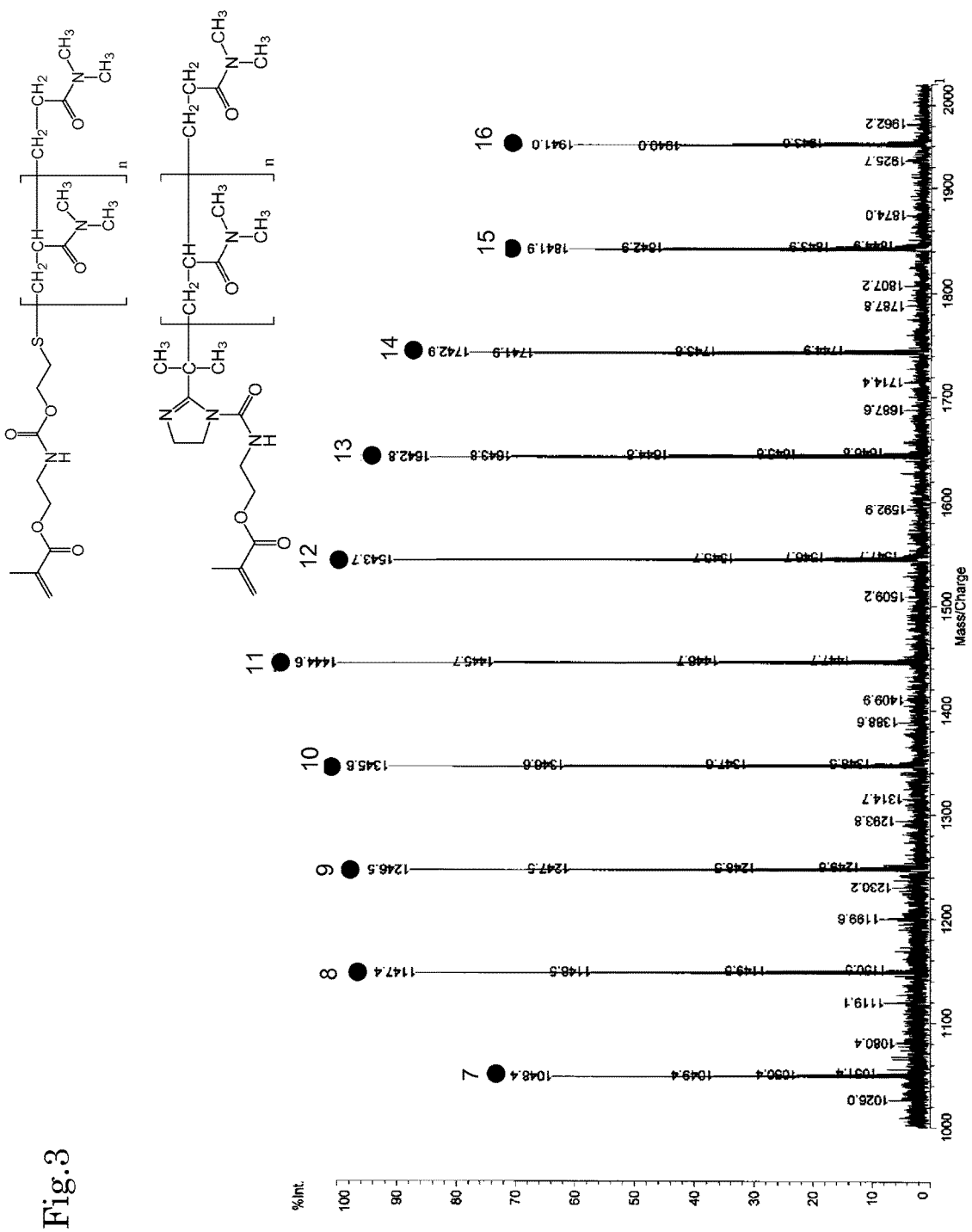
FIG. 3 is a MALDI-MS chart of a polymer in Example 14.

The MALDI-MS measurement of the macromonomer mixture of Example 14 to which the polymerizable functional group was introduced was carried out. The MALDI-MS chart of the macromonomer mixture of Example 14 is shown in FIG. 3. It can be understood that no nonfunctional peak is observed and a target macromonomer mixture is obtained.

Example 17

A silicone monomer expressed by the following formula (s1) (30 parts by weight), N,N-dimethylacrylamide (31 parts by weight), a silicone monomer expressed by the following formula (s2) (23 parts by weight), the macromonomer mixture obtained in Example 5 (6 parts by weight), ethylene glycol dimethacrylate (0.75 parts by weight), a photoinitiator Irgacure 819 (0.23 parts by weight) and tert-amyl alcohol (40 parts by weight) were mixed and stirred. A homogeneous, transparent monomer mixture was obtained. This monomer mixture was deaerated under argon atmosphere. In a glove box under nitrogen atmosphere, between two glass plates of 10 cm square and 3 mm thick (to one of them, an aluminum foil was attached for easy peeling off), two pieces of Parafilm of 100 μm thick whose center part was cut off were inserted as a spacer, into which a monomer mixture was cast, and polymerization between plates was conducted by light irradiation (Toshiba Corporation, FLED, 8.4 kls, for 15 minutes) to obtain a film-like sample.

The film-like sample obtained was irradiated with ultrasonic wave in water for 20 minutes, and peeled from the glass plate, immersed in a 60% aqueous isopropyl alcohol (IPA) solution at 60° C. overnight, further, immersed in a 80% aqueous IPA solution at 60° C. for 2 hours to extract impurities such as the residual monomer, and hydrated by immersion in a liquid with stepwisely lowered IPA concentrations, that is, a 50% aqueous IPA solution, a 25% aqueous IPA solution and water each for about 30 minutes. This was immersed in a borate buffer solution (pH 7.1 to 7.3) in a 200 mL glass bottle, the glass bottle was placed in an autoclave, and subjected to boiling treatment at 120° C. for 30 minutes. After standing to cool, the film-like sample was taken out from the glass bottle, and immersed in a borate buffer solution (pH 7.1 to 7.3).

Examples 18 to 21

At a charging ratio shown in Table 5, the same polymerization as in Example 1, the same functionalization as in Example 5 and the same polymerization of silicone hydrogel polymer as in Example 17 were carried out. The molecular weight and dynamic contact angle (advancing contact angle) of the macromonomer mixture obtained were as shown in Table 5.

Comparative Examples 3 to 6

At a charging ratio shown in Table 5, the same polymerization as in Example 1, the same functionalization as in Example 5 and the same polymerization of silicone hydrogel polymer as in Example 17 were carried out. The molecular weight and dynamic contact angle (advancing contact angle) of the macromonomer mixture obtained were as shown in Table 5.

Therefore, in Examples 18 to 21 and Comparative Examples 3 to 6, when dynamic contact angles of silicone hydrogels using the macromonomer mixtures having the almost same molecular weight are compared, it was confirmed that the dynamic contact angle of Examples 18 to 24 was small, and good wettability was shown.

TABLE 5

| | NVP (g) | Initiator (g) | 2-ME (g) | TAA (g) | MOI (g) | Mn (kD) | Mw (kD) | Advancing contact angle (°) |
|---|---|---|---|---|---|---|---|---|
| Example 18 | 77.80 | VA-061 | 1.75 | 2.50 | 2.055 | 191.45 | 16 | 46 | 88 |
| Example 19 | 77.80 | VA-061 | 0.44 | 1.37 | 2.055 | 185.75 | 48 | 129 | 63 |
| Example 20 | 77.80 | VA-061 | 0.44 | 0.68 | 2.055 | 184.16 | 48 | 161 | 59 |
| Example 21 | 77.80 | VA-061 | 0.25 | 0.86 | 1.028 | 210.12 | 89 | 231 | 61 |
| Comparative Example 3 | 77.80 | ADVN | 7.78 | 4.67 | 4.110 | 216.53 | 18 | 48 | 107 |
| Comparative Example 4 | 77.80 | ADVN | 1.56 | 4.67 | 3.426 | 201.60 | 56 | 117 | 104 |
| Comparative Example 5 | 77.80 | ADVN | 1.56 | 1.56 | 3.425 | 194.13 | 72 | 159 | 78 |
| Comparative Example 6 | 77.80 | ADVN | 0.78 | 1.56 | 1.027 | 192.27 | 96 | 235 | 73 |

Example 22

To a three-neck flask of 1 L were added 144.12 g (2.000 mol) of acrylic acid (hereinafter, AA), 640.0 g of water, a polymerization initiator VA-061 (Wako Pure Chemical Industries, Ltd., 0.375 g, 1.51 mmol) and 2-aminoethanethiol (hereinafter, 2-AET, 15.43 g, 0.2 mol), and a three way stopcock, a condenser, a thermometer and a mechanical stirrer were equipped. The inside of the three-neck flask was deaerated by a vacuum pump, and after argon substitution was repeated three times, the temperature was raised to 50° C., and the mixture was stirred. After about 30 minutes, after confirming start of decrease in polymerization heat, the temperature was raised to 70° C., and the mixture was stirred for 3 hours.

After completion of polymerization, the temperature was decreased to room temperature and the polymerization reaction liquid was concentrated by an evaporator to about 380 g, poured in acetone/n-hexane=1000 mL/200 mL, allowed to stand still overnight, and then the supernatant was removed by decantation. The residue was washed five times with acetone/n-hexane=500 mL/50 mL. The solid content was dried by a vacuum dryer at 40° C. overnight. After putting liquid nitrogen, it was pulverized with a spatula and transferred to a bag with a chuck. Drying was conducted by a vacuum dryer at 40° C. for 3 hours, thereby to obtain a terminal-reactive polymer mixture.

Example 23

90.00 g of the terminal-reactive polymer mixture obtained in Example 22, 30.0 mg of BHT (300 ppm to the polymer), 266.67 g of 1,4-dioxane and 400.00 g of N,N-dimethylacetamide were added to a four-neck flask of 1 L. To the four-neck flask, a mechanical stirrer, a glass stopper, a connecting tube connected to a nitrogen line and a Claisen tube were equipped, and to the forepart, a Liebig condenser, a distillation adaptor and a recovery flask were connected. While stirring under nitrogen stream, the temperature was raised to 132° C. (bath temperature), 94.59 g of 1,4-dioxane was distilled away, removing water from the reaction system. The temperature was decreased to 110° C., 60 µL of dibutyltin (IV) dilaurate and 18.08 g (0.1144 mol, MOI/AET=1.02) of 2-isocyanatoethyl methacrylate (MOI) were added thereto under nitrogen stream, and reacted at 110° C. for 2 hours.

After completion of reaction, the temperature was decreased to 70° C., 70 ml of ethanol was added and the mixture was stirred for 30 minutes. After cooling to room temperature, the polymerization reaction liquid was poured in acetone/n-hexane=700/300 mL. After allowing to stand still overnight, the supernatant was removed by decantation. The precipitate was washed twice with acetone/n-hexane=600 mL/150 mL, once with acetone/n-hexane/water=600 mL/150 mL/20 mL, and four times with acetone/n-hexane=600 mL/150 mL.

The solid content was dried by a vacuum dryer at 40° C. overnight. After putting liquid nitrogen, it was pulverized with a spatula and transferred to a bag with a chuck. Drying was conducted by a vacuum dryer at 40° C. for 3 hours, thereby to obtain a target macromonomer mixture. The molecular weight of the macromonomer mixture obtained is as shown in Table 7.

Example 24

At a charging ratio shown in Table 6, the same polymerization as in Example 22 was carried out.

TABLE 6

|  | AA (g) | VA-061 (g) | 2-AET (g) | Water (g) |
|---|---|---|---|---|
| Example 22 | 144.12 | 0.375 | 15.43 | 640.00 |
| Example 24 | 144.12 | 0.500 | 15.43 | 640.20 |

Example 25

At a charging ratio shown in Table 7, and using the terminal-reactive polymer mixture of Example 24, the same functionalization as in Example 23 was carried out. The molecular weight of the macromonomer mixture obtained is as shown in Table 7.

TABLE 7

|  | Terminal-reactive polymer mixture (g) | MOI (g) | Mn (kD) | Mw (kD) |
|---|---|---|---|---|
| Example 23 | Example 22 | 90.00 | 18.08 | 45 | 69 |
| Example 25 | Example 24 | 90.00 | 18.08 | 52 | 87 |

INDUSTRIAL APPLICABILITY

The present invention relates to a highly functionalized macromonomer mixture, and the macromonomer mixture is suitably used particularly in contact lenses, intraocular lenses, artificial corneas and the like.

What is claimed is:
1. A macromonomer mixture comprising macromonomer A of Formula e4:

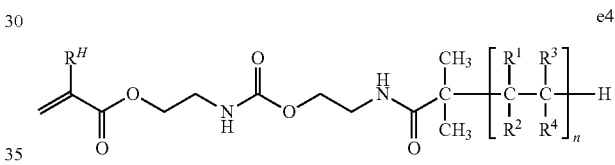

wherein $R^H$ is H or methyl; and wherein Formula e4 contains a polymeric group having n repeat units, wherein the polymeric group is derived from polymerization of a polymerizable monomer expressed by formula (m)

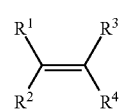

wherein $R^1$ through $R^4$ are any substituent groups on the polymerizable monomer;
and macromonomer B being a macromonomer having a group obtained by further introducing a polymerizable group into a reactive group on a chain transfer agent at an end thereof.

2. The macromonomer mixture of claim 1 wherein the reactive group is selected from the group consisting of a hydroxy group, an amino group, thiol, ester and carboxylic anhydride.

3. The macromonomer mixture of claim 1, wherein the polymerizable monomer expressed by formula (m) is a hydrophilic monomer.

4. The macromonomer mixture of claim 3, wherein the hydrophilic monomer is selected from the group consisting of N-vinylpyrrolidone, N,N-dimethylacrylamide, vinyl alcohol, (meth)acrylic acid, and 2-hydroxyethyl (meth)acrylate.

5. A method comprising polymerizing a hydrophilic monomer using a polymerization initiator having at least one functional group selected from the group consisting of a hydroxy group, an amino group and a carboxyl group in a molecule, and a chain transfer agent having at least one functional group selected from the group consisting of a hydroxy group, an amino group and a carboxyl group in a molecule to form the macromonomer mixture of any one of claim 1, 2 or 4, and reacting the macromonomer mixture with a compound having a radically polymerizable functional group.

6. The method of claim 5, wherein the chain transfer agent is a chain transfer agent expressed by any one of the following general formulas (d1) to (d5):

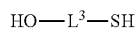 (d1)

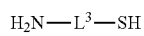 (d2)

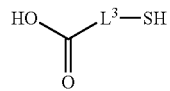 (d3)

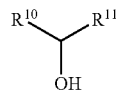 (d4)

 (d5)

wherein $L^3$ represents a divalent group having 1 to 10 carbon atoms; and $R^{10}$ and $R^{11}$ represent alkyl having 1 to 20 carbon atoms.

* * * * *